Oct. 8, 1929.  C. S. BRAGG ET AL  1,731,041
POWER ACTUATOR
Filed March 13, 1926   2 Sheets-Sheet 1
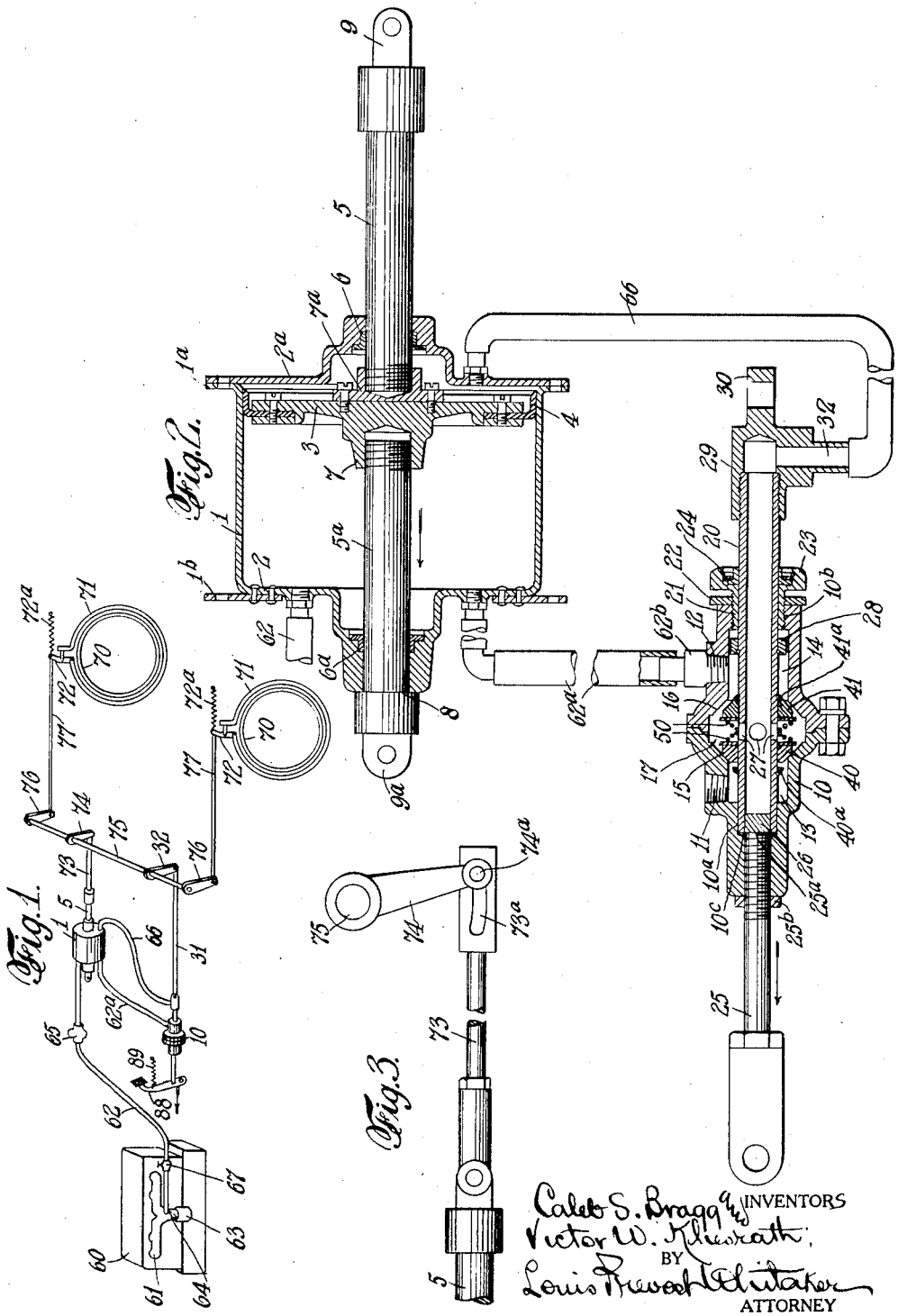

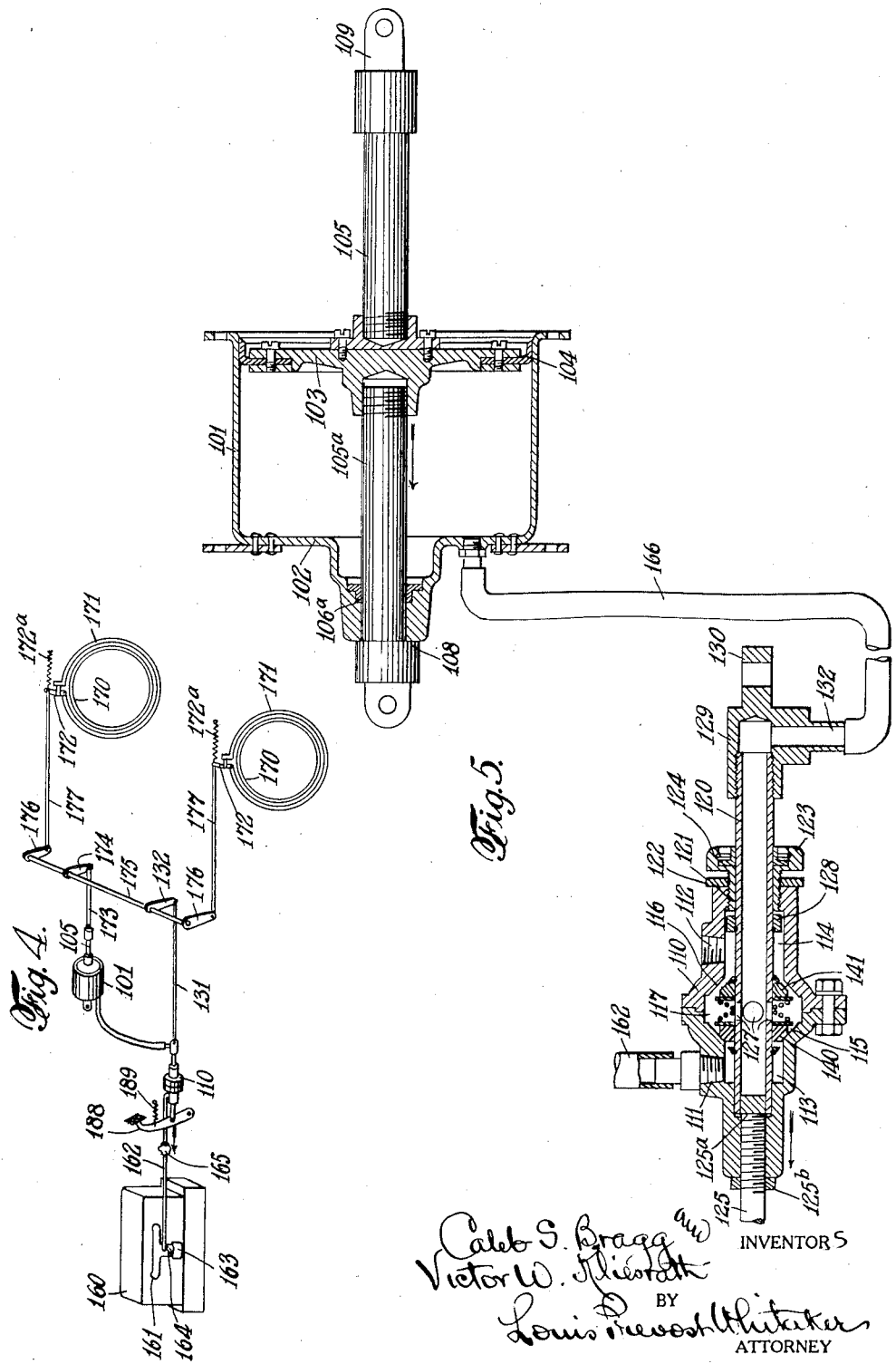

Patented Oct. 8, 1929

1,731,041

UNITED STATES PATENT OFFICE

CALEB SMITH BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed March 13, 1926. Serial No. 94,412.

Our invention consists in the novel features hereinafter described, reference being had to the accompanying drawings which illustrate several embodiments of the same, selected by us for purposes of illustration, and the said invention is fully disclosed in the following description and claims.

The object of our invention is to provide a very simple form of power actuator for actuating the brake mechanism of automotive vehicles having a cylinder and single acting piston therein, connected with the brake mechanism, the said piston being normally subjected either to atmospheric pressure on opposite sides, or to suction or partial vacuum on opposite sides, and provided with controlling valve mechanism operated by an operator operated part, preferably the ordinary foot lever or pedal lever, the valve mechanism being preferably located in linkage connecting the operator operated part with the brake mechanism and connected with the cylinder by flexible piping, the connections between the operator operated part and the valve mechanism being such that a relative movement is permitted between the valve actuating means and the valve casing sufficient to insure the operation of the valve, and after this lost motion is taken up, the operator may exert his physical force on the brake mechanism, either in addition to the force of the actuator, or on failure of power. We also prefer to provide a certain amount of lost motion in the connections between the actuator piston and the brake mechanism, so that in case of failure of power, the brake mechanism may be actuated by the physical force of the operator applied to the pedal lever, without moving the piston at all. The power stroke of the actuator is secured by atmospheric pressure on one face of the piston acting against suction or rarification on the other face under the control of the valve mechanism, the suction being conveniently obtained from the suction passage of the internal combustion engine employed to propel the vehicle, and the return movement of the piston is obtained by equalizing the pressures on opposite faces of the piston, and permitting the brake mechanism, by its own draft or load, to retract the piston so as to free the friction surfaces of the brake mechanism, and by means of the usual retracting spring, restore the brake mechanism and the actuator piston to normal or off position, and the valve mechanism is so constructed that it may be employed in connection with an actuator in which the piston is normally submerged in vacuum, and also in connection with an actuator in which the piston is normally submerged in air at atmospheric pressure.

Our invention also includes certain novel constructions and combinations of parts hereinafter described and pointed out in the claims.

In the accompanying drawings,

Fig. 1 is a diagrammatic view showing an installation in an automotive vehicle embodying our present invention, in which the piston is normally submerged in vacuum.

Fig. 2 is an enlarged view of the actuator cylinder and piston, and the valve mechanism therefor, illustrated in Fig. 1.

Fig. 3 is a detail view illustrating a slightly different manner of connecting the piston of the actuator with the brake mechanism, so as to permit the operation of the brake mechanism by the foot lever in case of failure of power, without moving the piston.

Fig. 4 is a view similar to Fig. 1, illustrating our present invention in connection with an actuator in which the piston is normally submerged in air at atmospheric pressure.

Fig. 5 is an enlarged view similar to Fig. 2, showing the actuator cylinder and piston, and the valve mechanism therefor, illustrated in Fig. 4.

Referring to the embodiment of our invention illustrated in Figs. 1 and 2, 1, represents the actuator cylinder, which in this instance at both ends, as by heads, 2, 2ª. In this instance the head, 2, is shown integral with the cylinder and the head, 2ª, bolted or otherwise secured thereto. For convenience of installation, the end of the cylinder adjacent to the head, 2ª, may be provided with a projecting flange, indicated at 1ª, having bolt holes for attaching the head, 2ª, to the cylinder, and the cylinder to the chassis, and the cylinder adjacent to the head, 2, is shown provided with lateral projecting portions, indicated at 1ᵇ, which may be in the form of an annular flange, if preferred, either formed integrally with the head, 2, or riveted or otherwise secured thereto and provided with bolt holes for attaching it to the chassis. The cylinder may be conveniently formed as a stamping, or it may be formed of cast metal and with separate heads attached in any usual or preferred manner. 3 represents a single acting piston located on the cylinder and provided with a gasket, 4. The piston is provided with a hub, in this instance formed in two parts, 7 and 7ᵃ, one part being formed separately and secured thereto, although this is not important or essential. The piston is provided with a piston rod, 5, extending through a stuffing box, 6, in the head, 2ᵃ, of the cylinder, and provided at its outer end with an attaching lug, 9, and the piston is also preferably provided with a piston rod, 5ᵃ, extending forwardly through a stuffing box, 6ᵃ, in the cylinder head, 2, and provided with an attaching lug or plug, 9ᵃ, so that as a matter of fact the piston may be made to either pull or push, according to the manner in which it is installed. The piston rod, 5ᵃ, is conveniently provided with a shoulder, indicated at 8, which may be on the collar to which the lug, 9ᵃ, is attached for engaging the outer end of the head, and limiting the rearward movement of the piston. In this instance we have shown in the diagram, Fig. 1, the piston rod, 5, connected by a link, 73, with an arm, 74, on a rock shaft, 75, provided with arms, 76, and, 32, the arm, 32, connected by link, 31, with the valve sleeve, 20, of the valve mechanism, 10, and arms, 76, connected by links, 77, with, in this instance, brake mechanism for two wheels of the vehicle, for example, the two rear wheels. It is to be understood that our invention is applicable to any type of brake mechanism, and that it may be applied by any intermediate connections, whether mechanical or hydraulic, to brake mechanism for one or more wheels of the vehicle or trailer, as may be found desirable. In the present instance, each of the brake mechanisms illustrated in the diagram, Fig. 1, include a friction drum, 70, brake band, 71, a brake lever, 72, and a suitable retracting spring therefor, indicated at 72ᵃ. In this instance, the valve mechanism is located in and supported by the connections between the operator operated part, consisting of an ordinary foot lever, 88, and the brake mechanism, said connections being independent of the connections between the piston and the brake mechanism, and the valve mechanism being connected with the cylinder and with the source of suction by a flexible piping to permit the valve mechanism to move longitudinally. The valve mechanism comprises a valve casing and a pair of valves capable of movement longitudinally of the casing, said valve casing and valves being, the one connected with the operator operated part, or foot lever, 88, and the other with the brake mechanism. In the present instance the valve casing is shown connected with the foot lever and the valves are carried by a valve operating part, or sleeve, connected with the brake mechanism, as hereinafter described. The valve casing, indicated at 10, is conveniently formed in two parts, bolted together, and provided interiorly with a centrally located valve chamber, 17, provided with oppositely disposed valve seats, 15 and 16, surrounding apertures communicating respectively with chambers 13 and 14. The valve casing is also provided, for convenience, with threaded apertures, 11 and 12, communicating respectively with the end chambers, 13 and 14, on opposite sides of the valve chamber, to either of which the pipe connection to the actuator cylinder may be attached, as desired, the other aperture being open to the atmosphere, or connected to the other source of higher pressure fluid. The end of the valve casing, adjacent to the foot lever, 88, is in this instance shown closed and provided with a threaded aperture to receive an adjustable, threaded link rod, 25, provided with a set nut, 25ᵇ, for reasons which will be explained later, the forward end of the link rod, 25, being pivotally connected to the foot lever, 88. The opposite end of the valve casing is provided with a stuffing box to accommodate a longitudinally movable valve actuating sleeve, 20, extending therethrough, and engaging a guiding recess, 10ᵃ, at the opposite end of the casing. For reasons which are hereinafter explained, the rear end of the valve casing is shown provided with an interiorly threaded aperture, 10ᵇ, to receive an adjustably threaded sleeve, 21, provided with a set nut, 22, and having an enlarged head portion, 23, in which the stuffing box, indicated at 24, for the sleeve, 20, is located. The sleeve, 20, is closed at its inner end, as by a plug, 26, and is provided with a plurality of apertures, 27, for establishing communication at all times between the interior of the sleeve, 20, and the valve chamber, 17, of the valve casing.

Upon the valve sleeve and within the chamber, 17, are located a pair of oppositely disposed valves, 40, 41, for engaging the valve seats, 15, 16, respectively, the said valves being movable with respect to the sleeve. These valves are preferably made of molded rubber, although this is not essential, and each valve is provided with a central aperture fitting the sleeve, 20, so tightly as to prevent leakage between the valve and sleeve, while permitting the movement of the sleeve therethrough. Each of the said valves when made of molded rubber, may be provided with conical recesses, for assisting in making a tight joint between the valves and the sleeve, as shown in our former application for Letters Patent filed October 2nd, 1925, Serial No. 60,018, or the necessary tight joint between the valves and the sleeve, 20, may be obtained in any other desired manner. The valves, 40 and 41, are normally pressed in opposite directions against the seats, 15 and 16, respectively, by yielding means, as springs, 50—50, and the sleeve, 20, is provided with collars, 40ᵃ and 41ᵃ, for engaging the exterior faces of the respective valves, 40 and 41, for the purpose of moving one or the other in a direction to open the valve. The collars, 40ᵃ and 41ᵃ, are so located with respect to the valves, as indicated in Fig. 2, that when the parts are in normal position, as indicated in that figure, the collar, 40ᵃ, is released, the valve, 40, permitting it to seat, and the collar, 41ᵃ, is in engagement with the valve, 41, and holds it slightly off of its seat, thereby establishing communication between the rear end chamber, 14, the valve chamber, 17, and the interior of the sleeve, 20.

Yielding retracting means are provided for returning the foot pedal and valve mechanism to, and holding them in the normal position, as indicated in Figs. 1 and 2. In this instance the lever pedal, 88, is shown as provided with a retracting spring, 89, normally tending to pull the lever and valve casing rearwardly, or in a direction opposite to the arrow, until the collar, 8, on the piston rod, 5ᵃ, engages the outer end of the piston head, 2, and the construction is such that when the foot lever is in its normal position, the valve casing will be in its rearward position with respect to the sleeve, 20, the forward end of the sleeve being in engagement with a shoulder, 10ᵇ, or the end of the adjustable link rod, 25, at the forward end of the recess, 10ᵃ, in the valve casing, which limits the relative movement of the valve casing and sleeve, 20, in one direction. The relative movement between the valve casing and sleeve in the opposite direction is limited adjustably by means of a stop collar, 28, on the sleeve, 20, within the chamber, 14, of the valve casing, which collar, 28, is adapted to engage the inner end of the adjusting sleeve, 21, and thereby limit the extent of opening of the valve, 40, when the valve casing is moved forward in the direction of the arrow, in Fig. 2. It will thus be seen that there is a limited amount of lost motion provided between the valve casing, 10, and the valve actuating sleeve, 20, the extent of which is adjustable by means of the sleeve, 21, and the link rod, 25. It will also be seen that whenever this lost motion is taken up by moving the valve casing in the direction of the arrow in Fig. 2, far enough to bring the stop collar, 28, into contact with the adjustable sleeve, 21, the further forward movement of the foot lever will enable the operator to apply his physical force directly to the brake mechanism through the connections between the brake mechanism and the sleeve, 20, hereinafter described, in addition to the force exerted by the actuator, or for the operation of the brake mechanism directly by the physical force of the operator in case of failure of power. By adjusting the sleeve, 21, and the link rod, 25, and securing them in adjusted position by the set nuts, 22 and 25ᵇ, the extent of opening of the valves, 40 and 41, can be regulated. The valve sleeve is provided with means for connecting it with the brake mechanism in this instance, and also with means for connecting it with a flexible pipe connection. In this instance the valve sleeve is shown as provided with a cap, 29, screw threaded, or otherwise secured thereto, and having a perforated lug, 30, which is connected by a link rod, 31, with an arm, 32, on the rock shaft, 75, thereby connecting the valve actuating sleeve positively with the brake mechanism. The cap, 29, is also provided with a pipe connection, indicated at 32, to which a flexible pipe, or tube, may be connected.

The same form of valve mechanism can be used with an actuator in which the piston is normally submerged in vacuum, and with an actuator in which the piston is normally submerged in atmospheric air, and in either case, the same valve 41, which we term the equalizing valve, is normally held open when the operator operated part is in its released or off position, while the other valve 40, which we term the differential valve, when opened after the closing of the equalizing valve creates differential pressures on opposite faces of the piston.

In the installation indicated in Figs. 1 and 2, in which the piston is normally submerged in vacuum, 41, is the equalizing valve, and 40 is the differential valve. A vacuum pipe, indicated at 62, extends from the intake manifold, 61, of the internal combustion engine, indicated at 60, preferably at a point between the throttle valve, 64, and carburetor, 63, and the engine cylinders, as shown, and this pipe, 62, is connected to the cylinder, 1, forward of the piston, as indicated in Figs. 1 and 2. The cylinder, forward of the piston, is also connected by a flexible pipe section, indicated at 62ᵃ, with the chamber, 14, of the valve casing, as by means of a fitting, 62ᵇ, the pipe 62ᵃ, being preferably connected, as shown, directly to the cylinder at a different point from the pipe 62, but on the same side of the piston. The suction pipe, 62, is preferably provided with a check valve, indicated at 65, and a restricting valve, indicated at 67. The pipe connection 32, for the valve actuating sleeve, 20, is also connected by means of a flexible pipe 66, with the cylinder, 1, of the actuator in rear of the piston, as shown in Figs. 1 and 2.

The parts being in the position indicated in Fig. 2, the piston being in its fully retracted position, which determines the normal or off position of the brakes, of the valve actuating sleeve, of the valve casing, and of the pedal lever, and assuming that the engine is running so that the suction of the intake manifold is available whenever the throttle is closed, or partially closed, the section of the manifold will withdraw through the suction pipe, 62, the air in the cylinder forward of the piston and at the same time, the air in the cylinder in rear of the piston, through the pipe, 66, the valve actuating sleeve, 20, the valve chamber, 17, the valve, 41, end chamber, 14, in the valve casing, and the pipe, 62ª. We prefer to provide a means for regulating the quantities of air which may be withdrawn from the cylinder into the intake manifold, and in this instance, provide an adjustable restricting valve, 67, in the pipe, 62, as disclosed in our former application for Letters Patent, filed December 22, 1923, Serial No. 682,346, although the extent to which valve, 41, may be opened, can be limited by the adjustable sleeve, 25, as will be explained in our description of Figs. 4 and 5. As soon as the air in the cylinder on both sides of the piston is exhausted, no further air will be withdrawn and delivered into the intake manifold, until after an actuation of the brake mechanism, while the actuator is in condition to secure an immediate power stroke, by simply admitting air as rapidly as desired under atmospheric pressure to the cylinder in rear of the piston. To apply the brakes, the operator will press the foot lever, 88, forward in the usual manner, thereby effecting a relative movement of the valve casing with respect to the valve actuating sleeve, 20, and valves, in the direction of the arrow in Fig. 2. This permits the valve, 41, to close, or seat, thereby disconnecting the cylinder in rear of the piston from the suction pipe, 62, after which the valve, 40, is opened, admitting air at atmospheric pressure through the aperture, 11, in the valve casing, into the valve chamber, 17, and through the apertures, 27, the valve actuating sleeve, 20, and pipe, 66, to the cylinder in rear of the piston, effecting an immediate forward movement of the piston under full power, without, however, admitting any appreciable quantities of air to the intake manifold. As the piston moves forward, in the direction of the arrow in Fig. 2, the brake mechanism is applied, and the operation of the brake mechanism effects the forward movement of the valve sleeve, 20, and valves independent of the valve casing within the limits of the lost motion, through the arm, 32, of the rock shaft, 75, and the link rod, 31, so that the forward movement of the piston continues so long as the foot lever, 88, is moved forward, and enables the operator to apply the brakes to the desired extent. As soon as the forward movement of the foot lever stops, the continued forward movement of the piston will cause a continued forward movement of the valve sleeve, 20, and the valves, and effect a relative movement between the said sleeve and valves and the valve casing, sufficient to close the valve, 40, and shut off the supply of the higher pressure fluid, to wit, atmospheric air, and permit the piston to hold the brakes as applied. The slightest subsequent movement of the piston in either direction would either open suction valve, 41, or atmospheric valve, 40, to either increase or decrease the state of rarification within the cylinder to the rear of the piston, and so automatically maintain a balanced condition between the pressure exerted on the piston and the draft of the brakes as applied. To partially release the brakes, the operator releases the pressure on the pedal lever sufficiently to permit the spring, 89, to retract the pedal lever and valve casing with respect to the valve sleeve, and effect the opening of the valve, 41, which will by-pass air from the rear to the front of the piston and reduce the differential of pressures on opposite sides of the piston, and allow the draft of the applied brakes to retract the piston sufficiently to release the engaged frictional surfaces of the brake mechanism to the desired extent. The brakes can be re-applied by a forward movement of the pedal lever, sufficient to close the valve, 41, and open the valve, 40. When the operator removes his foot from the foot lever and releases it, the spring, 89, will cause the rearward movement of the valve casing, 10, with respect to the valve actuating sleeve, 20, to again open the valve, 41, and connect the cylinder in rear of the piston and the cylinder forward of the piston through the pipe, 62ª, thereby equalizing the pressures on opposite sides of the piston, so as to permit the brake mechanism to release itself, and the suction pipe, 62, will withdraw the air from both sides of the piston equally, and permit the brake mechanism to readily return to normal position under the action of the draft of the brake mechanism and its retracting springs. It will thus be seen that in applying the brake mechanism no appreciable quantity of air is admitted to the intake manifold, after the release of the brake mechanism, pressures are equalized on opposite sides of the piston to permit the brakes to immediately release themselves, after which the air previously admitted to effect the operation of the brake mechanism is withdrawn from the cylinder on both sides of the piston, into the intake manifold, the restricting valve in the suction line, 62, serving to prevent the delivery of air into the intake manifold in such quantities as to stall the engine, if idling. By connecting the pipe, 62ª, directly to the actuator cylinder forward of the piston, and connecting the suction pipe, 62, to the same portion of the cylinder, but at a different point, it will be readily seen that the end portion of the cylinder forward of the piston forms a vacuum storage space, so that when the valve, 41, is opened after actuation of the brake mechanism, a large proportion of the air previously admitted in rear of the cylinder, is instantly transferred to this storage space forward of the piston, and the pressures within the cylinder on opposite faces of the piston will instantly become equalized so as to permit an instant release of the brakes, and the suction through pipe, 62, will thereafter withdraw the air previously admitted to actuate the brake mechanism, equally from both sides of the piston under the control of the restricting valve, or other restricting means of less area than the pipes, 62 and 66, and the valve mechanism.

It will be understood that when the operator has moved the lever, 88, forward, so as to apply the brake mechanism, he may, by exerting further pressure on the foot lever, move the rod, 20, far enough forward to bring the sleeve, 21, into engagement with the collar, 28, on the sleeve, 21, so as to transmit the physical force of the operator to the brake mechanism in addition to the power exerted by the actuator piston. It will also be seen that in like manner, upon failure of power, the operator can apply the brakes by physical force alone, by depressing the foot lever, 88, so as to bring the sleeve, 21, into engagement with the collar, 28. In so doing, the taking up of the lost motion provided between the valve actuating sleeve and valve casing, will place the valve in such position as to vent the cylinder so that the piston can be moved without any more resistance than the frictional resistance between the piston and cylinder, where the link rod, 73, from the piston, is connected to the arm, 74, without provision for lost motion. We, however, prefer to provide lost motion between these parts or in connection therewith, for which purpose we conveniently employ the construction illustrated in Fig. 3. In this figure, the connecting rod, 73, is provided at its rear end with a horizontal slit, 73ª, adapted to engage a pin, 74ª, carried by the arm, 74. This lost motion may, however, be provided in other ways. Where such lost motion is provided, it will be seen that in case of failure of power, the operator can, by means of the foot lever, 88, operate the brake mechanism directly through the connecting rod, 22, and arms, 78, without moving the piston. In this case, the resulting movement of the rock shaft, 75, and arm, 74, in the application of the brakes, merely causes the pin, 74ª, on the arm, 74, to travel along the slot, 73ª, without imparting motion to the piston. This construction enables the operator to apply his entire force to the application of the brakes without diverting any portion of it to effect the movement of the piston.

In Figs. 4 and 5, we have shown an embodiment of our present invention in which the actuator piston is normally submerged in air at atmospheric pressure, that is to say, the cylinder is normally in communication with the atmosphere on both sides of the piston, and the power stroke of the actuator is effected by withdrawing the air from the cylinder forward of the piston. In these figures, the actuator cylinder, indicated at 101, is provided with a closed head, 102, at one end, and at the other end is open to the atmosphere. The construction of the cylinder and piston is otherwise identical with the construction of the cylinder and piston previously described, and the various parts have been given the same reference characters with the addition of 100, and need not be again described.

Likewise, the valve mechanism shown in detail in Fig. 5, is constructed exactly as previously described with reference to the valve mechanism shown in detail in Fig. 2, the corresponding parts being given the same reference numerals, with the addition of 100. The same is true with respect to the brake mechanism, and the connection between it and the actuator piston, and the connections between the foot lever and valve casing, and between the valve actuator rod and the brake mechanism and actuator piston. The main difference between the two forms or embodiments of our invention is in the pipe connections between the valve mechanism and suction pipe leading to the manifold, and between the valve mechanism and the cylinder, which will be specifically described. In this instance the suction pipe, 162, is connected to the aperture, 11, at the forward end of the valve casing, and the aperture, 112, is open to the atmosphere, while the connection, 132, communicating with the interior of the valve actuating sleeve, is connected by a pipe, 166, with the actuator cylinder, 101, forward of the piston. In this installation, the valve, 141, is the equalizing valve, and is normally held open to connect the aperture, 112, with the cylinder forward of the piston, while the valve, 140, is the differential valve, and in this instance effects, by its opening, the communication between the suction pipe and the cylinder forward of the piston, the opposite face of the piston being at all times subjected to atmospheric pressure.

The parts being in normal position, as indicated in Fig. 2, it will be seen that atmospheric air has free access to the cylinder forward of the piston, through the aperture, 112, of the valve casing, 110, the end chamber, 114, through the partially opened valve, 141, and through the valve sleeve, 120, and pipe, 166, while the rear face of the piston is also acted on by the atmosphere, so that the piston, 103, may be properly said to be submerged in air at atmospheric pressure. Communication between the suction pipe, 162, and the actuator is cut off by the valve, 140, which is normally closed, and no air can pass to the intake manifold of the engine. To effect an application of the brakes in this construction, the foot lever, 188, is depressed, thereby moving the valve casing, 110, in the direction of the arrow, Fig. 5, with respect to the valve actuating sleeve, 120, thereby closing the valve, 141, shutting off communication between the atmosphere and the cylinder forward of the piston, and opening the valve, 140, thereby placing the suction pipe in communication with the valve chamber, 117, the interior of the sleeve, 120, flexible pipe, 166, and the cylinder of the actuator forward of the piston. As no restricting valve is used in the suction line, 162, we provide means for regulating the opening of the valve, 140, which in this instance is the suction valve, to prevent the withdrawal of air in such large quantities at a time as to stall the engine, if idling. The sleeve, 121, may be adjusted and secured in such relation to the collar, 128, so that a variably restricted or limited opening of the valve, 140, is permitted, which acts as a restricting device to regulate the delivery of the air to the manifold. Obviously, as soon as the valve, 140, is opened, and the atmospheric pressure, forward of the piston, is reduced and rarified, the pressure of atmospheric air on the rear face of the piston will move the piston and valve sleeve, 120, forward, in the direction of the arrows in Fig. 5, applying the brake mechanism to the desired extent. As soon as the forward movement of the foot lever and valve casing ceases, the slightest continued movement of the piston and the valve actuating sleeve will close the valve, 140, and shut off communication between the cylinder and the suction means, and the piston will hold the brake as applied, as any subsequent movement of the piston forward would open the atmospheric valve, 14, admitting air to the cylinder forward of the piston, and reducing the degree of rarification therein, and any reverse movement of the piston would open the suction controlling valve, 140, to increase the degree of rarification forward of the piston. To partially release the brakes, the operator releases the pressure on the pedal lever sufficiently to permit the spring, 189, to move the valve casing, 110 rearwardly (to the right) with respect to the valve sleeve, 120, to open the air inlet valve, 141, and admit air to the cylinder forward of the piston, thereby reducing the degree of rarification forward of the piston, permitting the draft of the applied brakes to withdraw the piston sufficiently to effect the desired release of the engaged friction surfaces of the brake mechanism. The brakes can be re-applied by a forward movement of the pedal lever, 188, and valve casing, 110, sufficiently to close the valve, 141, and open the suction controlling valve, 140.

When the operator removes his foot from the foot lever, the retracting spring, 189, will cause the valve casing, 110, to shift with respect to the valve actuating sleeve, 120, in a direction opposite to that indicated by the arrow in Fig. 5, thus opening the air inlet valve 141, while the suction valve, 140, remains seated, and admitting atmospheric air to the cylinder forward of the piston. This equalizes pressures on the opposite sides of the piston, and the draft of the applied brakes and the their retracting springs will restore the brakes and piston to the normal or off position.

It will be seen that the operator can add his physical force to the brake mechanism in addition to that of the actuator, or can operate the brake mechanism by his physical force in case of failure of power, exactly in the same manner as previously described, with reference to Figs. 1 and 2.

It will be understood that the connecting link, 173, from the valve actuating sleeve to the arm, 174, may be given a provision for lost motion, for example, in the same manner as indicated in Fig. 3, or otherwise, if desired, so that in case of failure of power the brake mechanism may be operated without moving the piston in the manner previously described with reference to Figs. 1, 2 and 3.

As will be seen, our improved construction provides a very simple arrangement in which the actuator cylinder may be attached to the chassis and directly connected with the usual rock shaft for applying the brake mechanism, while the valve mechanism may be inserted in the connections between the ordinary foot lever and such rock shaft, and connected with the actuator cylinder and with the intake manifold by pipes, portions of which are flexible, to provide for the longitudinal movement of the valve casing with respect to the parts to which it is connected by such pipes. The construction also provides lost motion between the foot lever and the brake mechanism sufficient to insure the operation of the valve mechanism and permitting the operator to apply his physical force directly to the brake mechanism when this lost motion is taken up, and lost motion is also preferably provided between the actuator piston and the brake mechanism, to avoid the necessity of moving the piston when the brakes are applied by the physical force of the operator alone. The piston (which is single acting) as will be seen, may be normally submerged in vacuum, in which case the brake mechanism is applied by admitting air to the cylinder in rear of the piston, and released by withdrawing it therefrom, or the piston may be normally submerged in atmospheric air, in which case the brake mechanism is applied by withdrawing air from the cylinder, forward of the piston. The valve mechanism is of the same construction in either case, and is so arranged that it may be used with either type of actuator, by making the proper pipe connections therewith.

It will be understood from the foregoing description that the same valve mechanism herein shown and described is capable of use with various sizes of power actuators and with installations in which the piston of the actuator is submerged in vacuum, as shown in Figs. 1 and 2, in which the differential valve 40, is the air inlet valve, and the equalizing valve, 41, is the suction valve, the extent of opening of which may be determined by the adjustment of the rod, 25, and the set nut, 25ª, where the restricting valve is not used; and said valve casing is also capable of use with installations in which the piston of the actuator is submerged in atmospheric air, as shown in Figs. 4 and 5, in which case the equalizing valve, 141, is the air inlet valve, and the differential valve, 140, is the suction valve, the extent of opening of which is limited by the adjustment of the sleeve, 121, with respect to the collar, 128. When either of these adjustments is used in an installation to effect the purpose for which it is intended, the other adjusting means, which will effect the air inlet valve, may be omitted altogether, or so manipulated as to permit any desired opening of the said air inlet valve.

It is to be noted that, in using the improved valve mechanism herein shown and described, with an actuator in which the piston is submerged either in vacuum or atmospheric air, one of these valves (the valve, 41, Fig. 2, or 141, Fig. 5), is held partially open when the operator operated part is in released or off position, so as to effect an equalization of pressures on opposite sides of the piston, and may be termed the equalizing valve, while the other valve, (the valve, 40, in Fig. 2, or 140, in Fig. 5), is opened after the closing of the equalizing valve, for the purpose of subjecting the piston to differential pressures on its opposite faces, and may be conveniently termed the differential pressure valve, the same valve being capable of use, as before stated, either with an actuator in which the piston is submerged in vacuum, when in off position, as in Fig. 2, or one in which the piston is submerged in atmospheric air, when in off position, as shown in Fig. 5.

It is obvious that the valve mechanism may be made to control more than one actuator by suitable pipe connections in the casing, indicated, for example, in our former application for Letters Patent of the United States, Serial No. 31,281, dated May 19, 1925.

What we claim and desire to secure by Letters Patent is:—

1. Controlling valve mechanism for power actuators having a cylinder and a single acting piston therein provided with means for connecting it with a part to be operated, said valve mechanism comprising a valve casing exterior to and movable with respect to the actuator cylinder, and provided with a centrally located valve chamber and separate chambers communicating therewith and located on opposite sides of the valve chamber, oppositely disposed valves controlling the communication between the valve chamber and said respective chamber, each of said separate chambers being provided with means for connecting a tubular connection therewith, yielding means for normally seating said valves, a valve actuating part extending through the valve casing and valves, movable longitudinally through said valves and having a sealing engagement therewith, and being provided with means for opening one of said valves by a longitudinal movement of said valve actuating part in either direction, means for connecting said valve chamber with a tubular connection adapted to be connected to the actuator cylinder, said valve casing and said valve actuating part being provided with means for connecting them in linkage between an operator operated part and the part to be operated by the piston of the actuator, whereby said valve mechanism may be employed with an actuator cylinder closed at both ends and also with an actuator cylinder communicating at one end with the atmosphere.

2. Controlling valve mechanism for power actuators having a cylinder and a single acting piston therein provided with means for connecting it with a part to be operated, said valve mechanism comprising a valve casing exterior to and movable with respect to the actuator cylinder, and provided with a centrally located valve chamber and separate chambers communicating therewith and located on opposite sides of the valve chamber, oppositely disposed valves controlling the communication between the valve chamber and said respective chamber, each of said separate chambers being provided with means for connecting a tubular connection therewith, yielding means for normally seating said valves, a valve actuating part extending through the valve casing and valves, movable longitudinally through said valves and having a sealing engagement therewith, and being provided with means for opening one of said valves by a longitudinal movement of said valve actuating part in either direction, means for connecting said valve chamber with a tubular connection adapted to be connected to the actuator cylinder, said valve casing and said valve actuating part being provided with means for connecting them in linkage between an operator operated part and the part to be operated by the piston of the actuator, and means for normally holding one of said valves in open position to maintain communication between the valve chamber and one of said separate chambers, whereby said valve mechanism may be employed to control an actuator having a cylinder closed at both ends, to maintain the piston submerged in pressures less than atmospheric and to control an actuator having a cylinder open at one end to the atmosphere, to maintain the piston normally submerged in air at atmospheric pressure.

3. Valve mechanism for controlling a power actuator comprising a cylinder and a single acting piston therein, provided with means for connecting it to the part to be operated, said valve mechanism comprising a valve casing separate from and movable with respect to the cylinder, and provided with a centrally located chamber and separate chambers on opposite sides thereof communicating therewith, each of said separate chambers being provided with means for attaching a tubular connection thereto, a normally closed differential pressure valve controlling the communication between the valve chamber and one of said separate chambers, a normally open equalizing valve controlling the communication between the central chamber and the other of said separate chambers, a valve actuating sleeve operatively connected with said valve and movable longitudinally with respect to the valve casing, said valve actuating sleeve being provided with means for attaching a tubular connection adapted to be connected with the actuator cylinder, an operator operated part, said valve casing and valve actuating sleeve being provided with means for connecting them respectively, the one to said operator operated part and the other to the part to be operated by the actuator piston, whereby said valve mechanism may be employed to control a power actuator having a cylinder closed at both ends for normally maintaining the piston submerged in pressures less than atmospheric and with an actuator having a cylinder communicating with the atmosphere at one end for normally maintaining the piston submerged in air at atmospheric pressure, and in either case may be made to substantially equalize pressures on opposite faces of the piston at any point in the piston stroke under the control of the operator operated part, to permit the piston of the controlled actuator to be retracted.

4. Valve mechanism for controlling a power actuator comprising a cylinder and a single acting piston therein, provided with means for connecting it to the part to be operated, said valve mechanism comprising a valve casing separate from and movable with respect to the cylinder, and provided with a centrally located valve chamber and separate chambers on opposite sides thereof communicating therewith, each of said separate chambers being provided with means for attaching a tubular connection thereto, a normally closed differential pressure valve controlling the communication between the valve chamber and one of said separate chambers, a normally open equalizing valve controlling the communication between the central chamber and the other of said separate chambers, a valve actuating sleeve operatively connected with said valve and movable longitudinally with respect to the valve casing, said valve actuating sleeve being provided with means for attaching a tubular connection adapted to be connected with the actuator cylinder, an operator operated part operatively connected with the valve casing, said valve actuating sleeve being provided with means for connecting it with the part to be operated by the actuator piston, means for limiting the inward movement of the valve actuating sleeve with respect to the valve casing, to limit the extent of opening of the equalizing valve, and means for limiting the outward movement of said sleeve with respect to the casing, to limit the extent of opening of the differential pressure valve and provide lost motion between the operator operated part and the part to be operated by the piston, for enabling the operator to apply his physical force to the latter.

5. Valve mechanism for controlling a power actuator comprising a cylinder and a single acting piston therein, provided with means for connecting it to the part to be operated, said valve mechanism comprising a valve casing separate from and movable with respect to the cylinder, and provided with a centrally located valve chamber and separate chambers on opposite sides thereof communicating therewith, each of said separate chambers being provided with means for attaching a tubular connection thereto, a normally closed differential pressure valve controlling the communication between the valve chamber and one of said separate chambers, a normally open equalizing valve controlling the communication between the central chamber and the other of said separate chambers, a valve actuating sleeve operatively connected with said valve and movable longitudinally with respect to the valve casing, said valve actuating sleeve being provided with means for connecting it with the part to be operated by the actuator piston, a stop on the valve actuating sleeve, an adjustable stop sleeve adjustably connected with the valve casing and surrounding said valve actuating sleeve for engaging said stop, to provide limited lost motion between the operator operated part and the part to be operated by the actuator piston, and to limit the extent of opening of the differential pressure valve.

6. Valve mechanism for controlling a power actuator having a cylinder communicating with the atmosphere at one end, and a single acting piston provided with means for connecting it with a part to be operated, said valve mechanism comprising a valve casing provided with a central chamber and separate chambers on opposite sides thereof and communicating therewith, one of said separate chambers being provided with means for connecting it with a source of suction and the other being provided with means for connecting it with the atmosphere, oppositely disposed valves for controlling the communication between said central chamber and said respective separate chambers, means for connecting said central chamber with the actuator cylinder between the closed end thereof and the piston, a valve actuating part movable longitudinally with respect to the valve casing, operatively connected with said valves for opening one by a movement in either direction, yielding means for normally seating said valve, an operator operated part, said valve casing and said valve actuating part being connected respectively, the one with the operator operated part and the other with the part to be operated by the actuator piston.

7. Valve mechanism for controlling a power actuator having a cylinder communicating with the atmosphere at one end, and a single acting piston provided with means for connecting it with a part to be operated, said valve mechanism comprising a valve casing provided with a central chamber and separate chambers on opposite sides thereof and communicating therewith, one of said separate chambers being provided with means for connecting it with a source of suction and the other being provided with means for connecting it with the atmosphere, oppositely disposed valves for controlling the communication between said central chamber and said respective separate chambers, means for connecting said central chamber with the actuator cylinder between the closed end thereof and the piston, a valve actuating part movable longitudinally with respect to the valve casing, operatively connected with said valves for opening one by a movement in either direction, yielding means for normally seating said valve, an operator operated part, said valve casing and said valve actuating part being connected respectively, the one with the operator operated part and the other with the part to be operated by the actuator piston, and means for normally holding in open position the valve controlling the communication between the central chamber of the valve casing and the separate chamber communicating with the atmosphere, to normally maintain the piston of the actuator submerged in air at atmospheric pressure, and to substantially equalize pressures on opposite faces of the piston of the actuator at any point of its stroke, to permit the piston to be retracted.

8. Valve mechanism for controlling a power actuator having a cylinder communicating with the atmosphere at one end, and a single acting piston provided with means for connecting it with a part to be operated, said valve mechanism comprising a valve casing provided with a central chamber and separate chambers on opposite sides thereof and communicating therewith, one of said separate chambers being provided with means for connecting it with a source of suction and the other being provided with means for connecting it with the atmosphere, oppositely disposed valves for controlling the communication between said central chamber and said respective separate chambers, means for connecting said central chamber with the actuator cylinder between the closed end thereof and the piston, a valve actuating part movable longitudinally with respect to the valve casing, operatively connected with said valves for opening one by a movement in either direction, yielding means for normally seating said valve, an operator operated part, said valve casing and said valve actuating part being connected respectively, the one with the operator operated part and the other with the part to be operated by the actuator piston, and means for normally holding in open position the valve controlling the communication between the central chamber of the valve casing and the separate chamber communicating with the atmosphere, to normally maintain the piston of the actuator submerged in air at atmospheric pressure, and to substantially equalize pressures on opposite faces of the piston of the actuator at any point of its stroke, to permit the piston to be retracted, and co-acting stops on the valve actuating part and the valve casing, for limiting the extent of opening of the valve interposed between said central chamber and the end chamber communicating with the suction means, and for enabling the operator to apply his physical force to the part to be operated by the actuator piston.

In testimony whereof we affix our signatures.

CALEB SMITH BRAGG.
VICTOR W. KLIESRATH.